United States Patent
Chan

(10) Patent No.: US 8,022,643 B2
(45) Date of Patent: Sep. 20, 2011

(54) LIGHTING NETWORK CONTROL SYSTEM AND CONTROL METHOD

(75) Inventor: Mansun Chan, Hong Kong (CN)

(73) Assignee: Lite Magic (HK) Limited, Kowloon, Hong Kong (CN)

( * ) Notice: Subject to any disclaimer, the term of this patent is extended or adjusted under 35 U.S.C. 154(b) by 290 days.

(21) Appl. No.: 11/575,326

(22) PCT Filed: Sep. 9, 2005

(86) PCT No.: PCT/CN2005/001450
§ 371 (c)(1), (2), (4) Date: Sep. 17, 2007

(87) PCT Pub. No.: WO2006/029566
PCT Pub. Date: Mar. 23, 2006

(65) Prior Publication Data
US 2008/0122384 A1    May 29, 2008

(30) Foreign Application Priority Data
Sep. 16, 2004 (CN) .......................... 2004 1 0074465

(51) Int. Cl.
*H05B 37/00* (2006.01)
*H05B 41/00* (2006.01)

(52) U.S. Cl. .................................... 315/312; 315/185 R

(58) Field of Classification Search .................. 315/312, 315/291, 307, 185 S; 362/225, 227, 237, 362/640
See application file for complete search history.

(56) References Cited

U.S. PATENT DOCUMENTS

| | | | | |
|---|---|---|---|---|
| 6,434,716 | B1 * | 8/2002 | Johnson et al. | 714/712 |
| 6,489,733 | B1 * | 12/2002 | Schmidt et al. | 315/312 |
| 6,653,797 | B2 * | 11/2003 | Puleo et al. | 315/185 S |
| 6,980,079 | B1 * | 12/2005 | Shintani et al. | 340/3.1 |
| 7,178,941 | B2 * | 2/2007 | Roberge et al. | 362/225 |

* cited by examiner

*Primary Examiner* — Douglas W Owens
*Assistant Examiner* — Minh A
(74) *Attorney, Agent, or Firm* — Leydig, Voit & Mayer, Ltd.

(57) ABSTRACT

The present invention relates to a lighting network control system and the corresponding control method. The control system consists of controllers, routers and illuminators connected via the serial connecting signal wires. The controller stores the control images and pictures. It transmits the serial control signal to routers and illuminators. The illuminators read in turn the serial control signal to extract the specific segment and transmit the rest to next device. A router reads in turn the specific segment from the control signal for its own stage. According to the requirements of the control signal, it transmits the control signal to different lighting network branches that connect with it. In the present invention, independent control to individual illuminator in the lighting network is implemented with comparatively lower cost. Arbitrary addition or reduction of illuminator(s) causes no affection to the entire system but to modify the signal data in the controller(s).

16 Claims, 5 Drawing Sheets

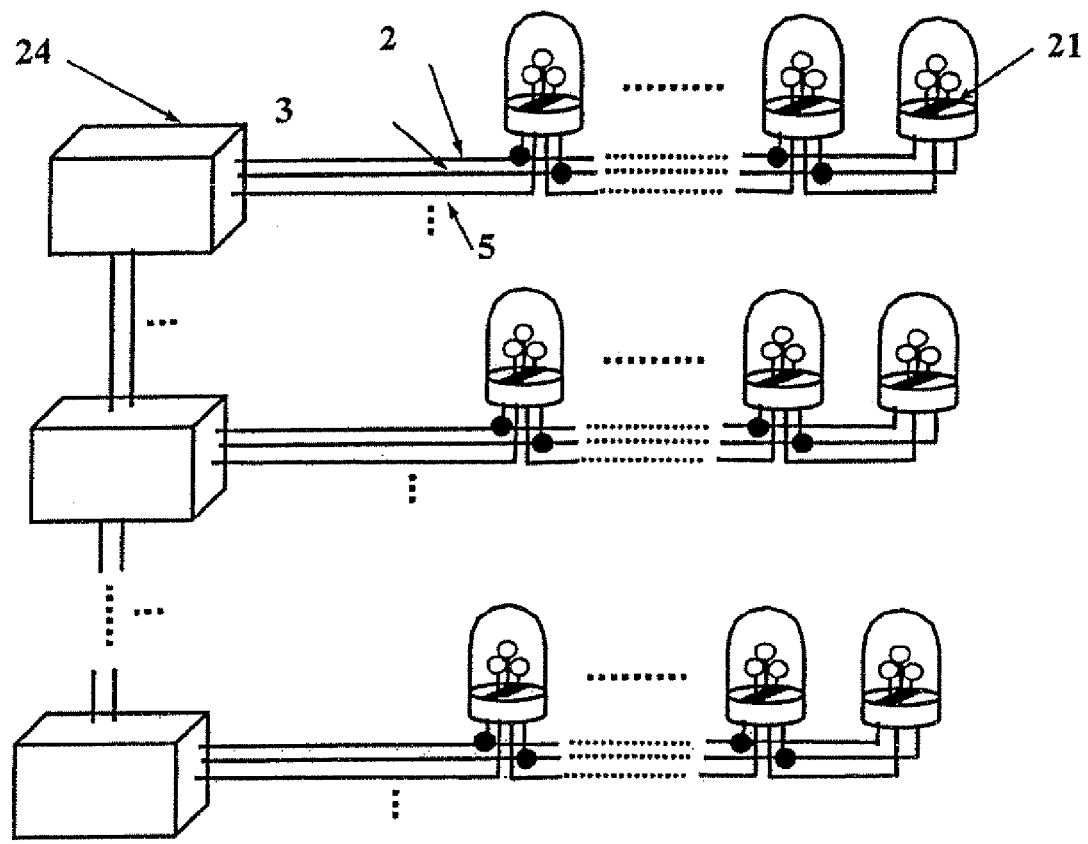
Fig. 2c
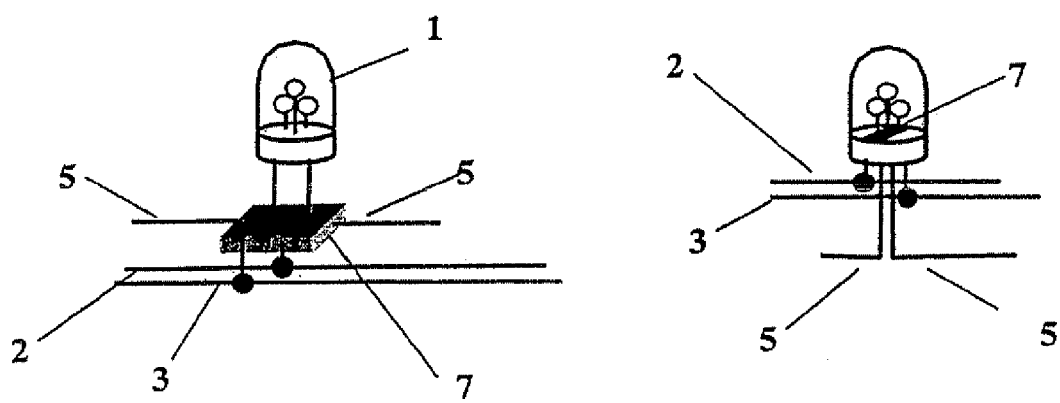
Fig. 3
Fig. 4

LIGHTING NETWORK CONTROL SYSTEM AND CONTROL METHOD

This application is a 371 of PCT/CN05/01450 Sep. 9, 2005.

FIELD OF THE INVENTION

The present invention relates to a lighting network control system and the method that is adopted to control illuminators in a control system.

DESCRIPTION OF THE PRIOR ART

The interconnected illuminators like bulbs are widely applied in outdoor decorations. In most systems, the simple collective on-off mode is adopted in the illuminators, or the on-off mode of some illuminator group is different from others. Therefore, little flexibility is implemented for these categories of illuminators. With the development of many advanced illuminators like LEDs, the demand on smart lamp systems that bear following functions is becoming more and more pressing: (1) full color spectrum; (2) illuminators are interconnected with a few cables; (3) each illuminator can be connected with any other one; (4) capable of separated control with consistent illuminators (except that with separated addresses); (5) a user can change the settings of the illuminators with ease. The problem of demand on high flexibility to network lighting system is well settled in the present invention.

FIG. 1 illustrates some interconnected decorative illuminators. In the lighting system shown in FIG. 1(a), all illuminators are turned on/off through the power supply, and can not be operated or controlled separately. And in the system shown in FIG. 1(b), the interconnected illuminators in one group are controlled through configuring the corresponding controller so as to reach the goal of limited group flexible control. If it is necessary to control every illuminator in this system separately, a great deal of cables are needed and so that the system will be very large and expensive. In addition, it is not convenient in this system to change the topology by increasing or decreasing illuminators.

Once it is necessary to reset the system's configurations, the entire system should be reconstructed once again. The more advanced system is shown in FIG. 1(c), where each illuminator accompanies with an MCU (micro control unit) and an address memory. The address of the illuminator is sent out first. Following disadvantages exist in this kind of system: (1) illuminators with MCU and address memory are extremely expensive; (2) Before connecting to the network, it is necessary to allocate a unique address for each illuminator, which makes the configuration process very complicated; (3) the number of unique addresses for illuminators are confined within the available ones (for instance, 8 bits of binary denote 256 addresses at most).

CN2483935Y disclosed a cascaded clustered illuminator control device, which composes of a computer and several control units. Each control unit can connect with one illuminator or a group of illuminators. The clustered illuminators are connected to the computer or MCU with data control bus. The control unit, which is composed of shift registers, latches and control circuits, stores the control data information sent from the computer and controls the connected illuminators with this control information. In this control system, all control units are connected in series. However, separate control to specific control unit can not be implemented. Only consistent illumination can be implemented in turn. And the number of cascaded illuminators is determined by the number of bits of the shift register.

SUMMARY OF THE INVENTION

The subject of the present invention is to provide an illuminator network control system and a control method in which the number of the control stages and control branches can be arbitrarily increased or decreased and every illuminator can be separately controlled.

An illuminator network control system, comprising a controller and at least illuminators, which are connected through control signal wires in series. The output signal of the controller is input into the adjacent illuminator. The illuminator includes an illumination unit or a group of illumination units, a control unit for receiving signals from the controller or the previous illuminator and selecting the control signal for it and transmitting the rest control signals to the next illuminator. The illuminator responds to the specific control signal which is selected by the signal receiver and makes the different lighting action.

The illuminator is connected with the live wire and ground wires of AC or DC supply. If the illuminator is connected with AC supply, it includes a power supply module to offer DC supply for the illuminator and the control unit. The illuminator can be an incandescent bulb or several, or fluorescent lamp, or an array of one or more LEDs, or one or more other lighting devices.

The control unit in the illuminator can be realized through general purpose MCU. Also it can be implemented in dedicated chips to save cost. One or more routers can be configured in the control system. A router is followed behind the controller or another router or any illuminator. Following the router, there is an illuminator network branch composed of at least one illuminator and/or one router. And according to the requirements of the received control signal, the router transfers the control signals to different illuminator network branches.

A router consists of the control unit and at, least two signal circuits. The control unit receives the control signal transmitted from its previous illuminator or router and transfers the different control signals to corresponding control signal wires via different signal circuits according to the requirements of the control signals.

The control unit in a router can be either an MCU or a dedicated chip to save cost.

The controller consists of the control unit, the memory and the signal circuit.

The memory is adopted to save the preset flash or picture data. The control unit reads data from the memory and performs the set program to generate control signal, and then transmits the control signal data stream or data frames via the signal circuit.

The control unit in a controller can be either an MCU or a dedicated chip to save cost.

Multiple controllers can be cascaded together in series so that the illuminator network branches of the controllers can form an illuminator network with arbitrary number of illuminators.

A method for controlling an illuminator network system can be implemented as follows:

A controller controls the illuminators in a tree topology according to the positions of the illuminators, i.e., according to the number of illuminators existing between the said illuminator and the controller. At the beginning of a control cycle, the control system implements as follows:

The controller sets the control signals for the illuminators and/or routers cascaded in series according to the distances between the illuminators and/or routers and itself;

The controller transmits serial control signals in turn to first illuminator and/or router through the last from close to a far distance after the signals are processed by the illuminators and/or routers;

The illuminator nearest to the controller receives the earliest control signal.

After performing specific lighting operations, it transmits the control signal for subsequent illuminators and/or routers; the illuminator locating in specific location receives corresponding control signal and performs specific lighting operations and transmits control signal for subsequent illuminators and/or routers;

According to the distance between the router and the controller, i.e., number of router between the router and the controller, the number of stages can be determined for the router which can be denoted from stage 0 to stage N. The router locating in specific location receives corresponding control signal and transmits the corresponding control signals for subsequent illuminators and/or routers to corresponding lighting network branches according to the requirements of the control signals.

The illuminator farthest away from the controller receives the last control signal from the controller and performs corresponding lighting operations.

The serial control signal from the controller is composed of data header with specific format, and the operands (which follow the said data header) of a series of illuminators, and the operands of routers. The operands of the routers consist of the router's control signal ID header, the routing operating code and the router's stage code;

When the control signal passes through the illuminator, the control unit of the illuminator extracts the first data segment behind of the data header and controls the lighting device of the illuminator. In the meantime, it removes the first illuminator's data segment and fills the fields behind the data header with the rest data segments and transmits it to the next adjacent illuminator or router;

When the control signal passes through the router, the control unit of the router first determines whether the operand is for the router or not. If yes, extracts the routing operand closely behind the data header, and transmits the data header together with the rest data segments for subsequent illuminators and/or routers to corresponding lighting network branches. If not, processes the data header and the operands behind the data header of the illuminators and/or routers and transmits it to a default lighting network branches till the operand for the router comes across the control signal.

The router's operating code includes the number of the port to which the control signal should be transmitted. The routers stage number code is a binary value;

When the control signal passes through the router, the control unit of the router determines whether the operand is for itself or not. If not, sends the data to current transmitting port of the router. If yes, performs following operations: first, determines whether the router's stage number code in the router's operand is zero or not. If yes, it indicates that the operand is for current stage of router. And the router adjusts the transmitting port according to the router's operand, and then sends the control signal following behind the router's operand to the port. If not, decreases the router's stage number code by one, and sends the router's operand and the control signal following behind the said router's operand to the port till the operand for this current stage of router comes across the control signal.

With the above lighting network structure and the control method, control to every illuminator and/or to separate ones can be implemented by setting control signals in the controller. Since any illuminator or router's operating mode has nothing to do with its structure or settings but something to do with its location in the network, once there is something wrong with one illuminator or router, it is only necessary to replace the abnormal one with a new one. No special setting is necessary to be done to let the system go normal. If it is necessary to add some illuminators or routers to the network, what should be done is to regulate the control signal in the controller according to the modification of the network topology.

Separate control to every illuminator is realized with the technical solution of the present invention. In the case of adding or removing illuminator(s) or lighting network branch(es) in the system, no affection will cause to existing network but to inform the controller to transmit a control signal differing from the previous according to the new network topology. Since no individual address is necessary in the system, no constraints exist to the number of illuminators in the lighting network. In addition, it is not necessary to record or process any illuminator's address. Thus, cost saves for the illuminators.

BRIEF DESCRIPTION OF THE DRAWINGS

In the following, the detailed implementation of the present invention is illustrated with the help of the figures.

FIG. 2c illustrates the structure of a lighting network control system whose controllers are cascaded;

FIG. 3 illustrates the illuminator whose control unit and the lighting device are separated;

FIG. 4 illustrates the illuminator whose control unit and the lighting device are bound together;

In those figures: 1. lighting device; 2. live wire of the power supply; 3. ground wire of the power supply; 4. switch box; 5. one or more control signal wires; 6. router; 7. control unit of the illuminator; 21. illuminator with control unit; 24. controller.

DETAILED DESCRIPTION OF THE PREFERRED EMBODIMENTS

Following examples are applied to explain the present invention; none of them is adopted to constrain the application of the present invention.

Figure 1A:
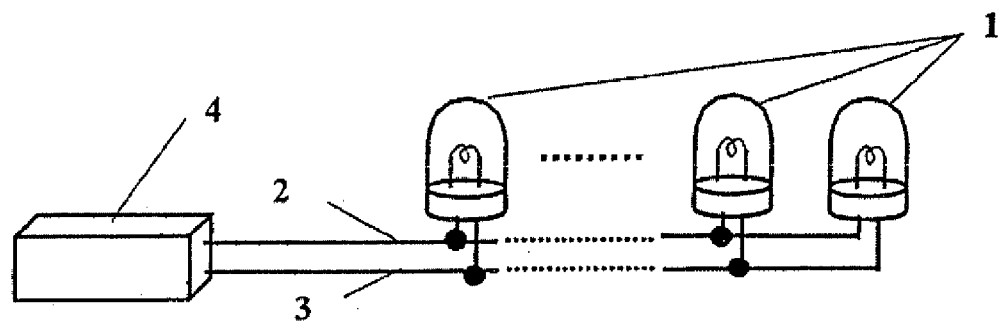
FIG. 1a illustrates the structure of a switch box that controls illuminators connected in series.
Figure 1B:
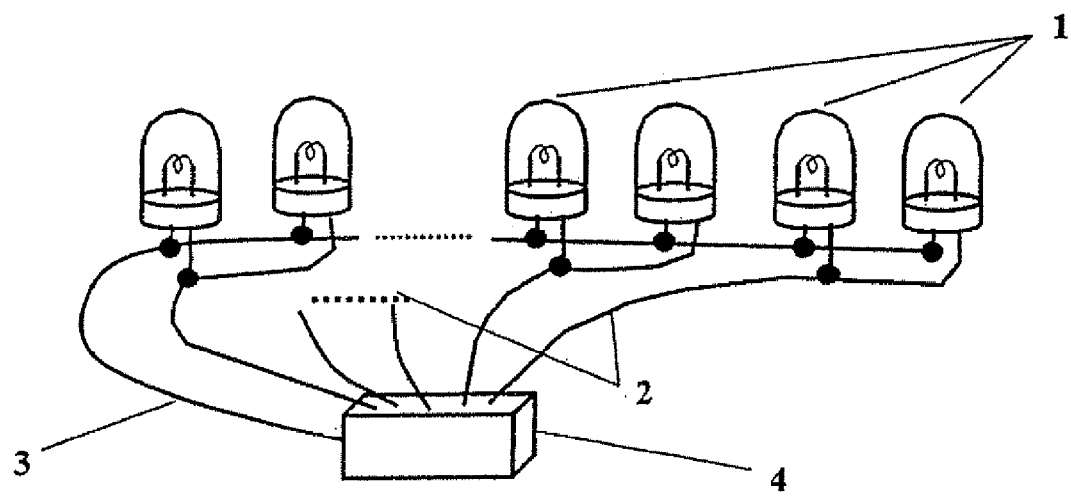
FIG. 1b illustrates the structure of a group of switches (in a switch box) that controls several groups of illuminators connection in parallel.
Figure 1C:
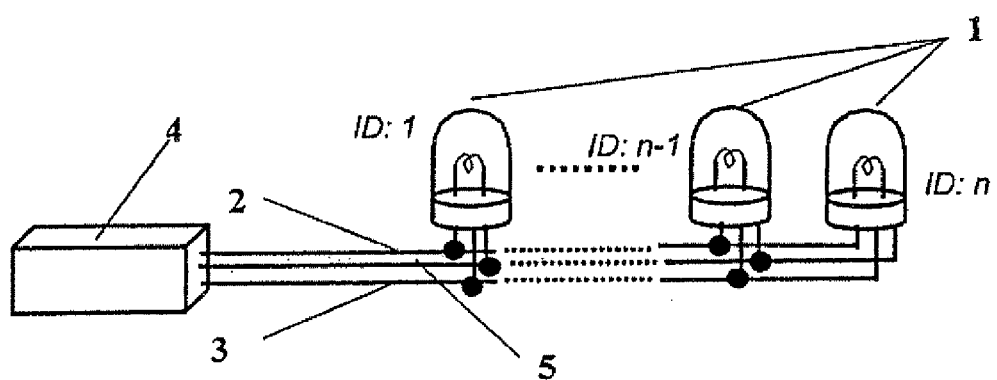
FIG. 1c illustrates the structure that one controller controls several illuminators with individual addresses.
Figure 2A:
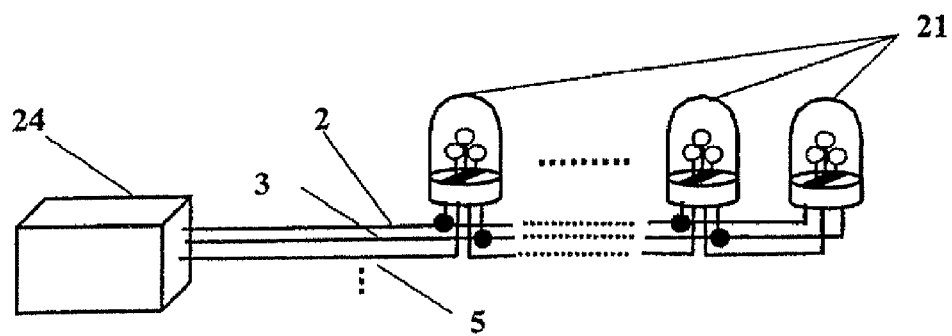
FIG. 2a illustrates the structure of a lighting network control system that one controller controls a group of illuminators connected in series.

FIG. 2a shows an implementation example of the present invention. The lighting network consists of a controller and n illuminators 21 that connect with the controller. The controller 24 consists of the Flash memory, the general purpose MCU and the signal circuit. The Flash memory is used to store picture data for illumination. The MCU reads data from the Flash memory and transmits the serial control signal through the signal circuit after the read out data is processed by a preset program. The illuminator consists of the general purpose MCU, the signal circuit and the lighting device 1. All illuminators are connected to the control signal wire in series. And the power supply is DC.

Figure 5A:
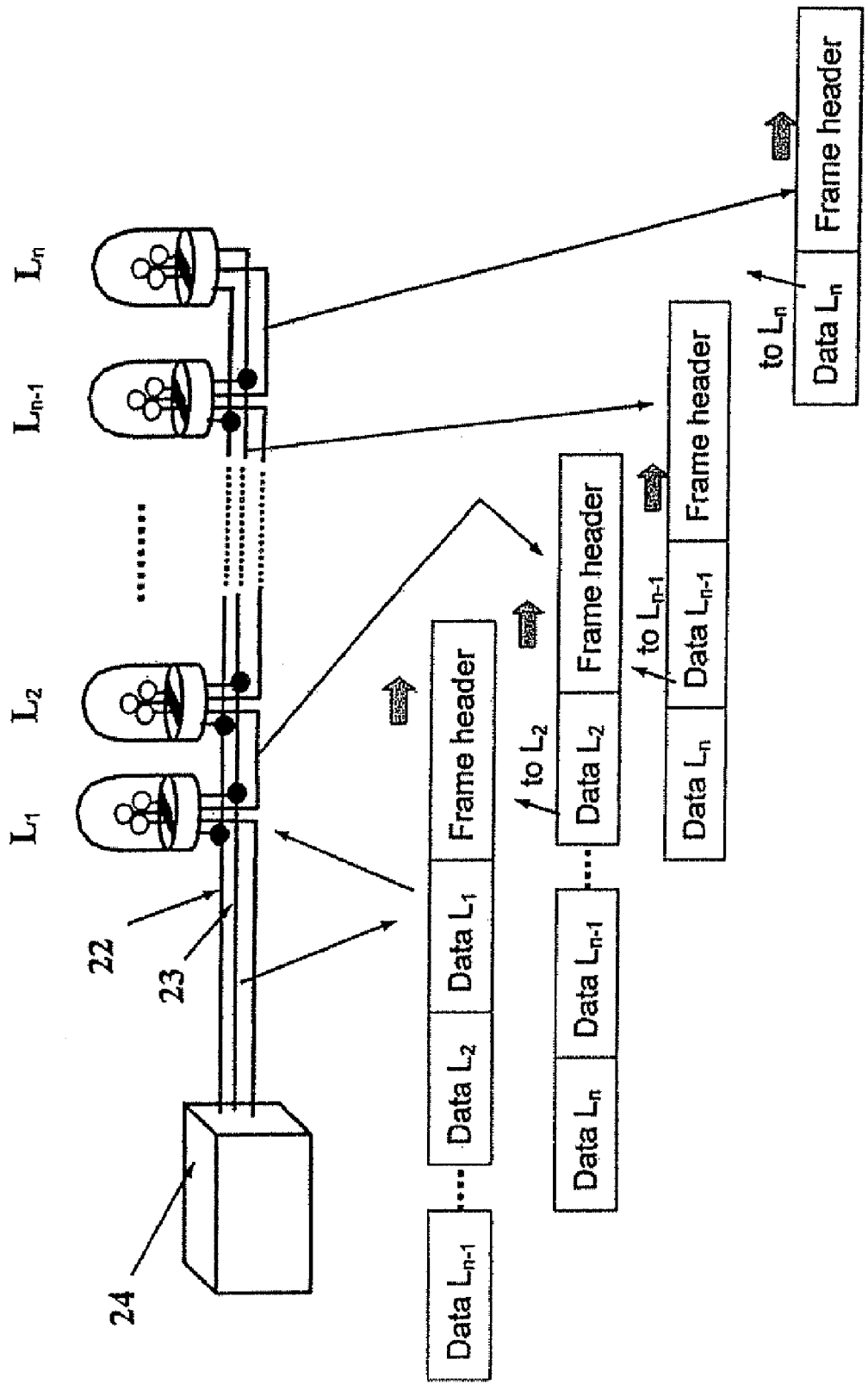
FIG. 5a illustrates the method with which to control a single-branch lighting network.

The serial control signal data is shown in FIG. 5*a*. The control signal includes the data Frame header and the operands of n illuminators. When the control signal reaches the first illuminator $L_1$, the illuminator's MCU extracts out the first operand Data $L_1$ behind the data Frame header and sends a command to the illuminator's lighting device then transfers the rest operands together with the data Frame header to the next illuminator. And the same process is implemented in the next illuminator till the nth illuminator extracts out the only one operand behind the data Frame header. Each illuminator extracts operand in turn only according to the distance between itself and the controller. Since the operands in the serial control signal is well programmed for the controller, individual control to illuminator n-i can implemented by modifying the corresponding data segment Data Ln-i in the serial control signal of the controller.

Figure 2B:
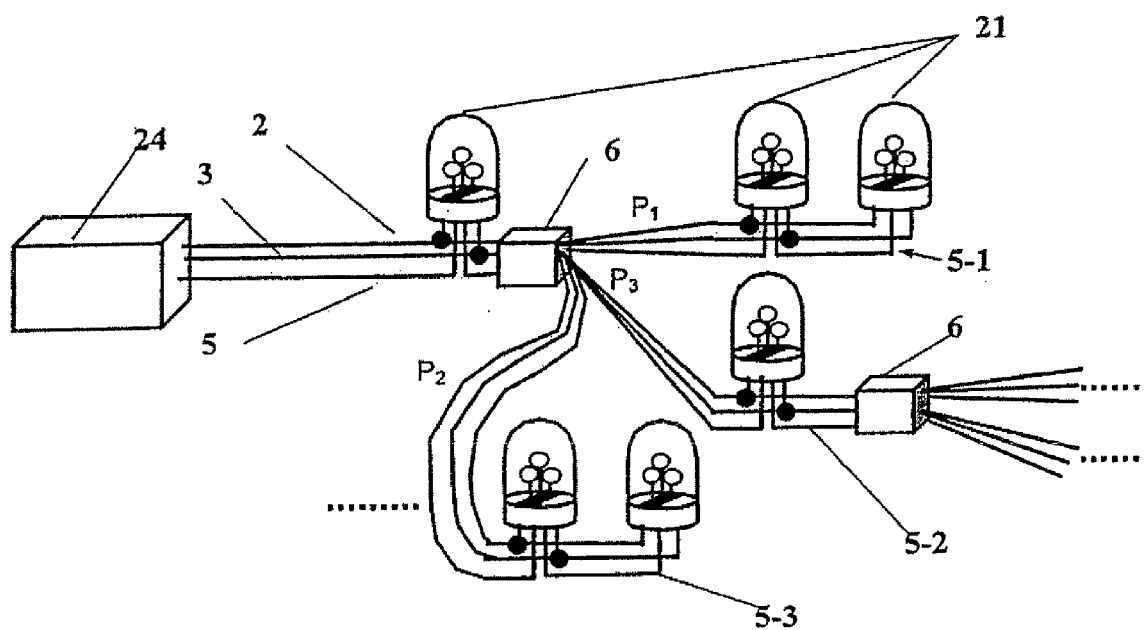
FIG. 2b illustrates the structure of a lighting network control system that consists of routers and lighting network branches.

FIG. 2*b* shows the second implementation example for the present invention. The control signal from the controller 24 is transmitted to three lighting network branches P1, P2 and P3 after it passes through one illuminator (may be more than ones) and the router 6. The router consists of the MCU and three signal circuits. The MCU receives signal from the previous illuminator and transfers it to different lighting network branches through different signal circuit after it is processed by the MCU. And in the controller, the operand is preset well for each illuminator in each branch. According to the tree-structure of the lighting network, router's operands are added to the serial control signal.

Figure 5B:
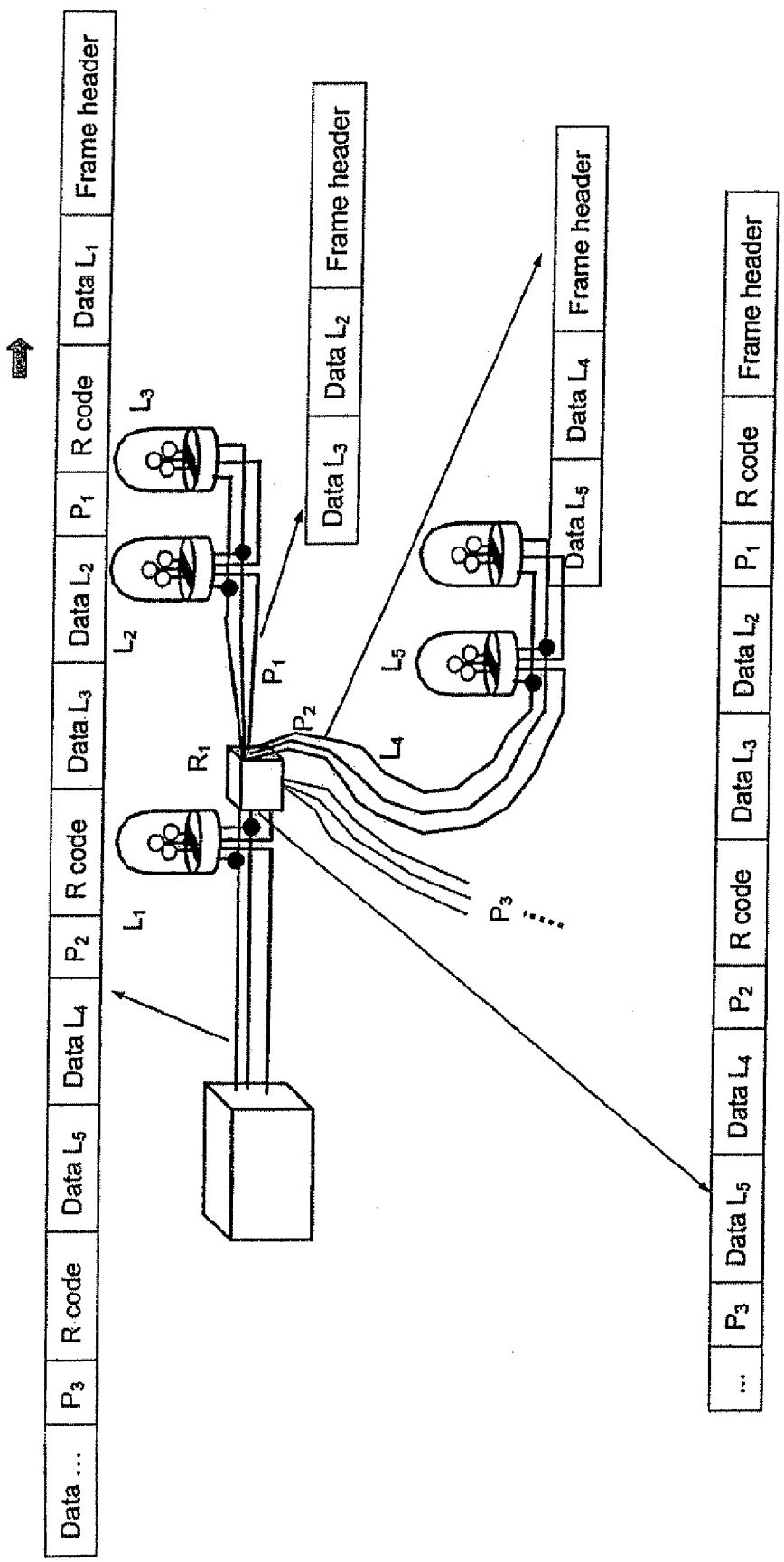
FIG. 5b illustrates the control method with which to control the tree-structure lighting network.

FIG. 5*b* illustrates the control method applied in the tree-structure lighting network system. The control signal from the controller composes of data Frame header, the illuminator's operand, the router's operand, etc. When the control signal reaches the first illuminator, the operand corresponding to the first illuminator works and is removed from the control signal. And when the control signal reaches the first router, according to the router's operand, it is required that the control signal behind RCODE-P1 be transmitted to the lighting network branch P1, the control signal behind RCODE-P2 to the lighting network branch P2, the control signal behind RCODE-P3 to the lighting network branch P3. If the signal behind RCODE-P3 is not the operand of router R1, it is always transmitted to branch P3 till another operand is received for the router to change routing port. FIG. 2*c* shows the third implementation example of the present invention. In this example, several controllers are connected in series with each connecting a series of illuminators. In this implementation, the first controller is the main one, and the rest implement the control signal sent from the main one, transmitting the control data to corresponding lighting network branches. The control signal transmitted from each controller to corresponding lighting network branch is consistent with that in the first implementation example.

The invention claimed is:

1. An illuminator network control system comprising:
a controller generating and outputting serial control signals on a control signal wire, each serial control signal including a plurality of data segments; and
a plurality of address-less illuminators connected in series through the control signal wire, each illuminator including a respective control unit connected to the control signal wire and controlling illumination of the respective illuminator in response to a respective data segment of the serial control signal, wherein
the serial control signal is sequentially input to the plurality of the illuminators connected in series through the control signal wire, from the illuminator closest to the controller to the illuminator most remote from the controller,
each control unit selects from the serial control signal, if present in the control signal, the data segment corresponding to the respective illuminator, extracts the corresponding data segment from the serial control signal, if present in the serial control signal, and transmits any remaining data segments of the serial control signal to any remaining illuminators of the plurality of illuminators, and
the data segments correspond to the respective illuminators based on physical positions of the respective illuminators along the control signal wire, wherein each of the illuminators is individually controlled without assigning respective control addresses to any of the illuminators or the control units, or including addresses in the serial control signal.

2. The control system according to claim 1, wherein each of the control units is an MCU or a dedicated chip.

3. The control system according to claim 1, wherein
the controller comprises a controller control unit, a memory, and a controller signal circuit,
the memory stores preset flash or picture data, and
the controller control unit reads the data stored in the memory, from the memory, executes a program to generate the serial control signal, and transmits a data stream or data frames including the data segments via the controller signal circuit as the serial control signal.

4. The control system according to claim 3, wherein the controller control unit is an MCU or a dedicated chip.

5. The control system according to claim 1, further comprising:
a router having
an input connected to the control signal wire at a location between the controller and at least some of the plurality of illuminators, and
at least two outputs connected to respective router control signal wires; and
a respective plurality of the address-less illuminators connected in series through each of the router output signal wires as respective illuminator network branches, wherein the router transfers the serial control signal output by the controller to respective illuminator network branches as respective router control signals in accordance with instructions within the control signal.

6. The control system according to claim 5, wherein
the router comprises a router control unit and at least two signal circuits, and
the router control unit receives the serial control signal and transmits respective serial router control signals to the router control signal wires via respective signal circuits in accordance with instructions within the control signal.

7. The control system according to claim 6, wherein the router control unit is an MCU or a dedicated chip.

8. A method of controlling a lighting network, the lighting network including a controller generating and outputting a serial control signal on a control signal wire, a plurality of address-less illuminators connected in series through the control signal wire, each illuminator including a respective control unit connected to the control signal wire and controlling illumination of the respective illuminator in response to the serial control signal, the method comprising:

establishing a respective data segment, in the controller, for controlling each of the illuminators, based upon physical positions of the respective illuminators with respect to each other along the control signal wire;

transmitting a serial control signal including the data segments from the controller, on the control signal wire, serially, to the plurality of illuminators in a sequential order corresponding to the respective distance of each illuminator from the controller, from the illuminator closest to the controller, to the illuminator most remote from the controller; and at each illuminator, receiving, if present in the serial control signal, the corresponding data segment for the respective illuminator and controlling the respective illuminator in response to the corresponding data segment, if present in the serial control signal, removing the corresponding data segment from the serial control signal, and transmitting remaining data segments of the serial control signal, if any, to subsequent illuminators, if any, wherein each of the illuminators is individually controlled without assignment of a unique address to any of the illuminators or the control units or including addresses in the serial control signal.

9. The method of claim 8 wherein the lighting network includes a router having an input connected to the control signal wire at a location between the controller and at least some of the plurality of illuminators, the router including at least two outputs connected to respective router signal control wires and corresponding pluralities of illuminators serially connected to the respective router control signal wires as respective network branches, the method comprising:

transmitting the serial control signal to the router;

generating, within the router, corresponding router control signals; and outputting the router control signals on the respective router control signal wires to control, individually, illumination of the illuminators of the respective router network branches.

10. An illuminator network control system comprising:

a plurality of illuminators, each illuminator including first and second power terminals respectively connected to a live wire and a ground wire of a power supply so that the illuminators are electrically connected in parallel with respect to the power supply, a control unit controlling illumination of the illuminator in response to a control signal, and first and second control terminals connected to the control unit of the illuminator, wherein the plurality of illuminators are connected in series through the control signal wire, the control signal wire being connected from the second control terminal of a respective illuminator to the first control terminal of a next illuminator, each control unit controlling illumination of the respective illuminator; and a controller generating and outputting a serial control signal to the control signal wire, each control signal including a plurality of data segments, wherein the serial control signal is sequentially input to the plurality of the illuminators through the control signal wire and the first and second control terminals of the respective illuminators, from the illuminator closest to the controller, to the illuminator most remote from the controller, each control unit selects from the serial control signal, if present, a data segment corresponding to the respective illuminator, extracts the corresponding data segment, if present in the serial control signal, and transmits any remaining data segments of the serial control signal on the control signal wire to any remaining illuminators of the plurality of illuminators, and the data segments correspond to the respective illuminators based on physical positions of the respective illuminators along the control signal wire, so that each of the illuminators is individually controlled without assigning an address to any of the illuminators or the control units, or including addresses in the serial control signal.

11. The control system according to claim 10, wherein each of the control units is an MCU or a dedicated chip.

12. The control system according to claim 10, wherein the controller comprises a controller control unit, a memory, and a controller signal circuit, the memory stores preset flash or picture data, and the controller control unit reads the data stored in the memory, from the memory, executes a program to generate the control signal, and transmits a data stream or data frames including the data segments via the controller signal circuit as the serial control signal.

13. The control system according to claim 12, wherein the controller control unit is an MCU or a dedicated chip.

14. The control system according to claim 10, further comprising:

a router having first and second inputs connected to the live wire and the ground wire of the power supply, respectively, and a third input connected to the control signal wire at a location between the controller and at least some of the plurality of illuminators, first and second outputs outputting the live wire and ground wire inputs of the power supply and at least two branch control wire outputs connected to respective router control signal wires; and respective pluralities of the address-less illuminators electrically connected in parallel to the first and second outputs of the router and electrically connected in series through respective router control signal output signal wires as respective illuminator network branches, wherein the router transfers the serial control signal output by the controller to respective illuminator network branches, as respective router control signals, in accordance with instructions within the control signal.

15. The control system according to claim 14, wherein the router comprises a router control unit and at least two signal circuits, and the router control unit receives the control signal and transmits respective router control signals to the router control signal wires via respective signal circuits in accordance with the instructions within the control signal.

16. The control system according to claim 15, wherein the router control unit is an MCU or a dedicated chip.

\* \* \* \* \*